United States Patent [19]
Garcken et al.

[11] Patent Number: 5,778,074
[45] Date of Patent: Jul. 7, 1998

[54] METHODS FOR GENERATING VARIABLE S-BOXES FROM ARBITRARY KEYS OF ARBITRARY LENGTH INCLUDING METHODS WHICH ALLOW RAPID KEY CHANGES

[75] Inventors: Knute T. Garcken, Ventura; Charles E. Strawbridge, Camarillo; Andrew Philip Kisylia, Agoura Hills, all of Calif.

[73] Assignee: Teledyne Industries, Inc., Newbury Park, Calif.

[21] Appl. No.: 673,437

[22] Filed: Jun. 28, 1996

Related U.S. Application Data

[60] Provisional application No. 60/000,676, Jun. 29, 1995.
[51] Int. Cl.$^6$ .................................................... H04L 9/06
[52] U.S. Cl. .................................. 380/37; 380/28; 380/42
[58] Field of Search ................................... 380/21, 37, 42, 380/28, 29

[56] References Cited

U.S. PATENT DOCUMENTS

| | | |
|---|---|---|
| 4,195,196 | 3/1980 | Feistel . |
| 4,431,865 | 2/1984 | Bernede et al. . |
| 4,531,020 | 7/1985 | Wechselberger et al. . |
| 4,751,733 | 6/1988 | Delayaye et al. . |
| 4,803,725 | 2/1989 | Horne et al. . |
| 4,897,876 | 1/1990 | Davies . |
| 5,003,596 | 3/1991 | Wood ........................................ 380/28 |
| 5,214,704 | 5/1993 | Mittenthal ................................ 380/37 |
| 5,237,611 | 8/1993 | Rasmussen et al. . |
| 5,365,589 | 11/1994 | Gutowitz . |
| 5,412,729 | 5/1995 | Liu . |

*Primary Examiner*—Gilberto Barrón, Jr.
*Attorney, Agent, or Firm*—Knobbe, Martens Olson & Bear, LLP

[57] ABSTRACT

A system for generating variable substitution boxes from arbitrary keys for use in a block cipher system utilizes an initial set of linearly independent numbers to generate substitution tables. The initial set of linearly independent numbers is modulated with the bits of an arbitrary key through operations that result in final sets of linearly independent numbers to form the substitution tables. The system also includes an implementation which allows for rapid key changes for the crypto system by only generating portions of the substitution tables as needed for specific blocks of input data to be encrypted or decrypted.

23 Claims, 7 Drawing Sheets

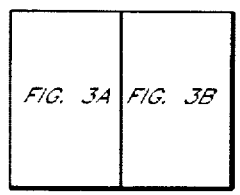
FIG. 3
FIG. 3B
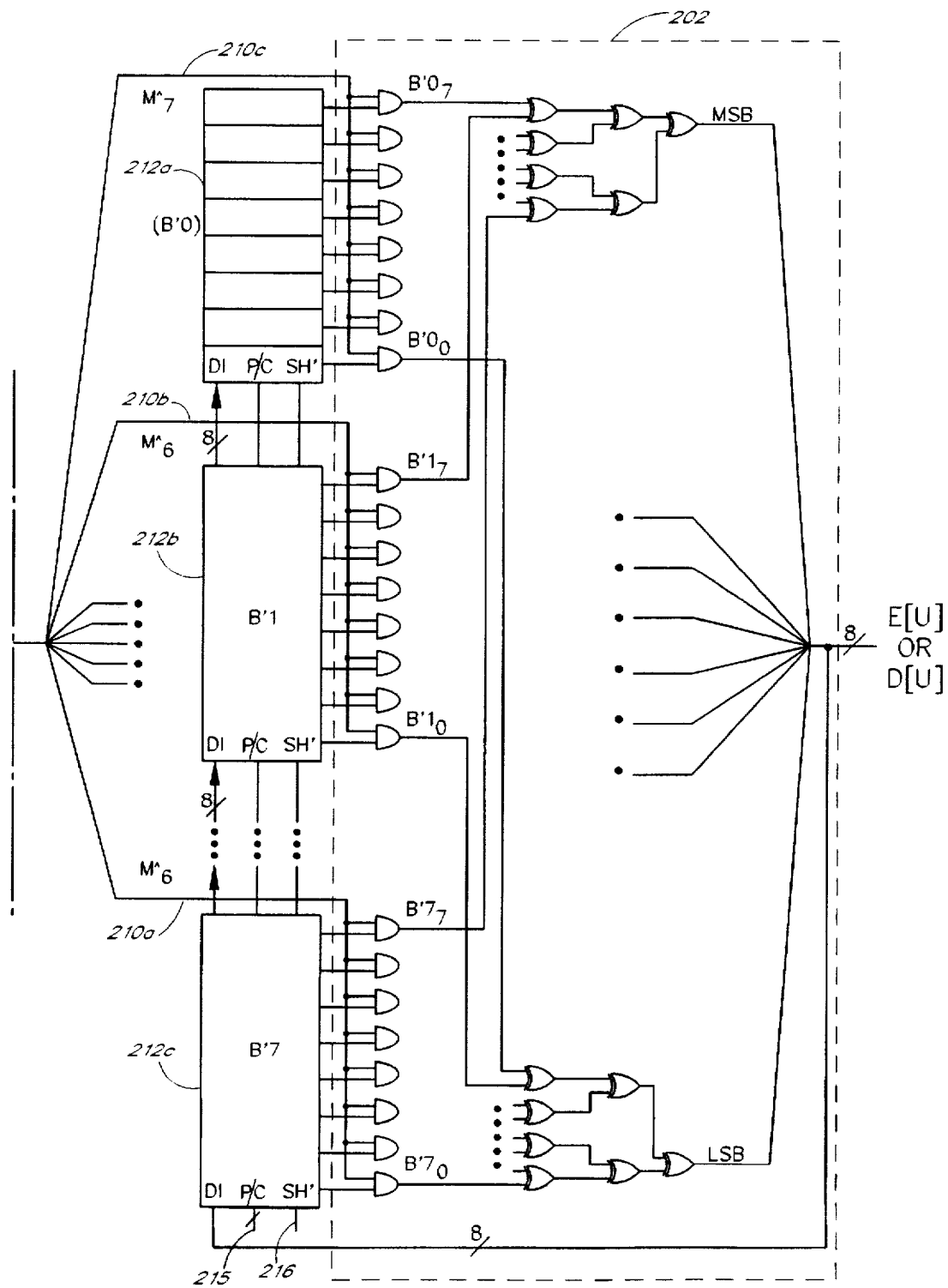

METHODS FOR GENERATING VARIABLE S-BOXES FROM ARBITRARY KEYS OF ARBITRARY LENGTH INCLUDING METHODS WHICH ALLOW RAPID KEY CHANGES

PRIORITY CLAIM

This application claims the benefit of U.S. Provisional Application No. 60/000,676 entitled "Block Cipher System that Uses High-Quality, Variable S-Boxes Generated from a Key which may Vary in Length," filed Jun. 29, 1995 now abandoned.

BACKGROUND OF THE INVENTION

1. Field of the Invention

The present invention relates generally to block cipher systems which, like the Data Encryption Standard (DES), break a block of data to be encrypted (plaintext) into smaller sub-blocks and then, among other processes, use substitution tables (S-Tables) to provide substitute values for the sub-blocks of plaintext.

Description of Related Art

In DES, the S-Tables are organized into eight substitution boxes (S-Boxes), each of which consists of four, 16-entry S-Tables, where each S-Table entry is a 4-bit number—i.e., 0000 through 1111 (0 through 15). The input to a DES S-Box is a 6-bit sub-block. Two bits determine which of the four S-Tables to use and the remaining four bits index the selected S-Table. In DES, a 56-bit key is used to generate a "schedule" of 16, 48-bit sub-keys. In each of the 16 iterations or "rounds" used by DES, one of the sub-keys is combined with a portion of the plaintext, or that round's derivative thereof, using an exclusive-or (XOR) operation. The 48-bit XOR-sum is then broken into eight, 6-bit sub-blocks and the S-Boxes are used to provide substitutions for those sub-blocks.

Any block cipher system may be attacked by trying all possible keys until one is found for which a given set of plaintext blocks result in the same encrypted blocks (ciphertext) as they do for the device being attacked. This "brute force" method of cryptanalysis is known as an exhaustive key search and, even with today's high-speed computers, a modest key length requires a prohibitive amount of processing to accomplish. Effective cryptanalysis of a block cipher system attempts to reduce the processing required to find the correct key from that required for an exhaustive key search.

A fundamental weakness of DES and DES-like cryptographic systems is that the contents of the S-Tables are fixed and, in the case of DES, public knowledge. One may attempt to keep secret the contents of fixed S-Tables, but it must be assumed that eventually those contents will be available to a cryptanalyst. Hence, a cryptanalyst has the opportunity to conduct a detailed analysis of the statistical biases inherent in any S-Table mapping before he conducts a key search. That analysis is useful against any key used by the block cipher device under attack. A second fundamental weakness of DES-like systems is that the derivation of the sub-keys from the key is a fixed, linear process. In essence, key bits interact with plaintext bits in a known, linear process. Because of this linear interaction of the key material with the plaintext, it is possible, using a large number of plaintext/ciphertext pairs, to translate the knowledge about the S-Box mapping biases into information about specific key bits. If enough key bits can be determined using this information, an exhaustive search with respect to the remaining key bits becomes feasible.

In the last several years, two methods of cryptanalysis, Differential Cryptanalysis and Linear Cryptanalysis have been developed which attack these fundamental weaknesses of DES-like cryptographic systems. These methods of cryptanalysis are used to substantially reduce the key search effort from that required for an exhaustive key search. It is important to note that the effectiveness of these methods increases rapidly as fewer numbers of rounds are used by the block cipher system. Mitsura Matsui, a well-known cryptanalyst, using Linear Cryptanalysis, has successfully recovered all 56 bits of a key used in a full, 16-round DES implementation in 50 days using twelve high-speed computers (HP9735/PA-RISC 99 MHz) in a parallel process. A DES implementation reduced to 8 rounds, however, can be broken by Linear Cryptanalysis in less than a minute using one modem personal computer.

SUMMARY OF THE INVENTION

All other things being equal, a block cipher system that uses a larger key will be more resistant to cryptanalysis than one using a smaller key. As a consequence, one strategy that NSA has adopted regarding the export of block cipher systems is to require that an exportable block cipher system use a smaller key than its domestic version. Therefore, it is desirable that a block cipher device which is intended for both domestic and foreign use be configurable to use a shorter key such that it cannot be reconfigured to use a longer key. In such a system it is also desirable that the key length have little or no impact on the encryption/decryption logic implemented in the device and that the key length have no impact on the cryptographic characteristics of the device, other than with respect to an exhaustive key search. Advantageously, a domestic version is usable with a foreign system to achieve a secure link by applying some simple manipulation of the shorter key to create a larger key for the domestic system.

In modern digital communication systems, data from many different sources is "packetized" and then time multiplexed into one data stream. As a consequence, block cipher systems employed in these communication systems must be able to change encryption/decryption keys from one packet to the next while introducing as little data latency as possible. Block cipher systems which generate their S-Tables from the key are usually at a disadvantage in these applications because the amount of processing required to generate the S-Tables is generally orders of magnitude greater than the amount of processing required, for example, to generate the sub-key schedule used in DES. It is desirable, therefore, to be able to generate S-Tables in a fashion which may be implemented such that the time it takes a block cipher to affect a key change is roughly comparable to the time it takes for that block cipher to encrypt one block of plaintext.

One aspect of the present invention is to provide a block cipher system using S-Tables which is not vulnerable to Differential and Linear Cryptanalysis. Advantageously, the system is efficiently implementable in a monolithic device which includes an embedded microprocessor and random access memory (RAM), and is also efficiently implementable in a monolithic device which includes neither a microprocessor nor RAM.

In another aspect of the present invention, a fixed, stored S-Table of known cryptographic quality may be transformed, using a complete set of linearly independent numbers, into one of a large number of possible different S-Tables, each of which will exhibit the same characteristics of cryptographic strength as are exhibited by the fixed S-Table from which they are derived. Advantageously, the complete set of linearly independent numbers are derived from an arbitrary key of arbitrary length.

In one advantageous embodiment of the present invention, a block cipher device can effectively generate each new, variable S-Table from the key variable, as a linear transformation of a fixed S-Table, with a data latency that is comparable to the data latency required for the device to encrypt/decrypt one block of plaintext/ciphertext.

One aspect of the present invention involves a block cipher system, in which sub-blocks of data are replaced by other sub-blocks as defined by one or more mappings, wherein each mapping can be expressed as a substitution table. This system has a number of complete sets of linearly independent numbers from which a first complete set of linearly independent numbers is selected, a key, and means for generating resulting n-bit encryption tables (E) and n-bit decryption tables (D) from a fixed n-bit source substitution table (R) stored in memory and the first complete set of linearly independent n-bit numbers modulated by the key. Another aspect of the present invention involves a means by which a second complete set of linearly independent numbers may be generated from the first complete set of linearly independent numbers by modulating the first complete set of linearly independent numbers by an arbitrary key. In a preferred embodiment, the key modulated complete set of linearly independent n-bit numbers form a linear transformation to apply to the source substitution table (R). More advantageously, the linear transformation is executed as follows:

For K from 0 through $2^n-1$:

$$E[T(K)]=T(R[K]),$$

and $$D[T(R[K])]=T(K).$$

In a particularly preferred embodiment, the linear transformation is executed as follows:

For K from 0 through $2^n-1$:

$$E[T(K)]=T(R[K]\oplus F),$$

and $$D[T(R[K]\oplus F)]=T(K),$$

where F is an n-bit value determined from the key.

In addition, in one embodiment, the linear transformation (T) is performed on the source substitution table (R), wherein the transformation (T) is generated from the key and the selected first complete set of linearly independent numbers.

In another embodiment, the means for generating comprises means for concurrently generating, from the first complete set of linearly independent numbers and the key, a second complete set of linearly independent n-bit numbers to form a first linear transformation (T), and a third complete set of linearly independent n-bit numbers to form a second linear transformation $(T^{-1})$ which is the inverse of the first linear transformation (T).

In yet another embodiment, the means for generating comprises means for generating the n-bit output of a temporary n-bit encryption substitution table (E), or a temporary n-bit decryption substitution table (D) on an as needed basis, for each n-bit input value (U) without generating the entire encryption substitution table (E) or entire substitution table (D). Advantageously, the means for generating further comprises matching encryption and decryption source substitution tables, $R_E$ and $R_D$, stored in memory, and further comprises means for performing an n-bit transformation, T, and its inverse, $T^{-1}$, as follows:

$$E[U]=T(R_E[T^{-1}(U)]),$$

and $$D[U]=T(R_D[T^{-1}(U)]).$$

Another aspect of the present invention involves a block cipher system having a first complete set of linearly independent numbers, each of a selected bit length, a key of a predetermined bit length, a source substitution table stored in memory, a modulation module responsive to selected bits from the key to control operations on the linearly independent numbers to obtain a second complete set of linearly independent numbers, a transformation module which transforms the source substitution table stored in memory using the second complete set of linearly independent numbers to obtain a resulting substitution table, and an encryption module which has an input and an output, said input comprising data blocks to be encrypted and said output comprising substitution blocks for said data blocks, the substitution blocks obtained from said resulting substitution table. Advantageously, the modulation module responds to selected key bits to select certain numbers from the first set of linearly independent numbers to form the second set of linearly independent numbers. Further, the modulation module is advantageously responsive to other key bits to select certain numbers from the second set linearly independent numbers for XOR operations with other numbers from the second set of linearly independent numbers.

In one embodiment, the transformation module forms a matrix of the second set of linearly independent numbers and uses this matrix as a transformation of the source substitution table to form the resulting substitution table. Advantageously, the transformation module right multiplies data from the source substitution table by the matrix to form the resulting substitution table.

DEFINITIONS OF TERMS

An n-bit number is any number which is expressible using n binary digits or bits. As an example, the 8-bit numbers are the numbers which take on the values 0 through 255, all of which can be expressed using 8 bits, e.g., 255=11111111.

An n-bit S-Table is a lookup table consisting of $2^n$ entries, each consisting of an n-bit number. The value for which a substitute is sought (input) indexes the table and the entry or contents of the table at that index position (memory location) provides the substitute output.

A complete set of linearly independent n-bit numbers, under the XOR operation, is a set of n, n-bit numbers such that no one of those numbers can result from the XOR-sum of any combination of the others. Each of the n-bit numbers may be generated as the XOR-sum of some combination of a complete set of linearly independent n-bit numbers.

Let R be an n-bit source S-Table stored in Read Only Memory (ROM) and R|i| be the value of entry i in that table.

Let E be an n-bit encryption S-Table stored in random access memory (RAM) and E|i| be the value of entry i in that table.

Let D be an n-bit decryption S-Table stored in RAM and D|i| be the value of entry i in that table.

Let $X_{bit\ i}$ represent bit i of the n-bit number X (i=0 ... (n-1)), where $X_{bit\ 0}$ is the least significant bit of X and $X_{bit\ n-1}$ is the most significant bit.

"⊕" is bitwise addition modulo 2, or the exclusive-or (XOR) operation. "*" is bitwise multiplication, or the logical AND operation: 1*1=1, 1*0=0, 0*1=0, and 0*0=0.

DESCRIPTION OF THE PREFERRED EMBODIMENTS

Several embodiments consistent with the present invention are described below. Specifically, an embodiment using a microprocessor and memory such as RAM and ROM, an embodiment using memory but no microprocessor, and an embodiment using no microprocessor and no RAM. The block cipher encryption system of the present invention can be used in any digital encryption communication system such as in set-top boxes for the delivery of digital television programming data, and for any digital communication transmissions such as with modems, cable modems, ATM switches, networks, internet gateways, etc.

Figure 1:
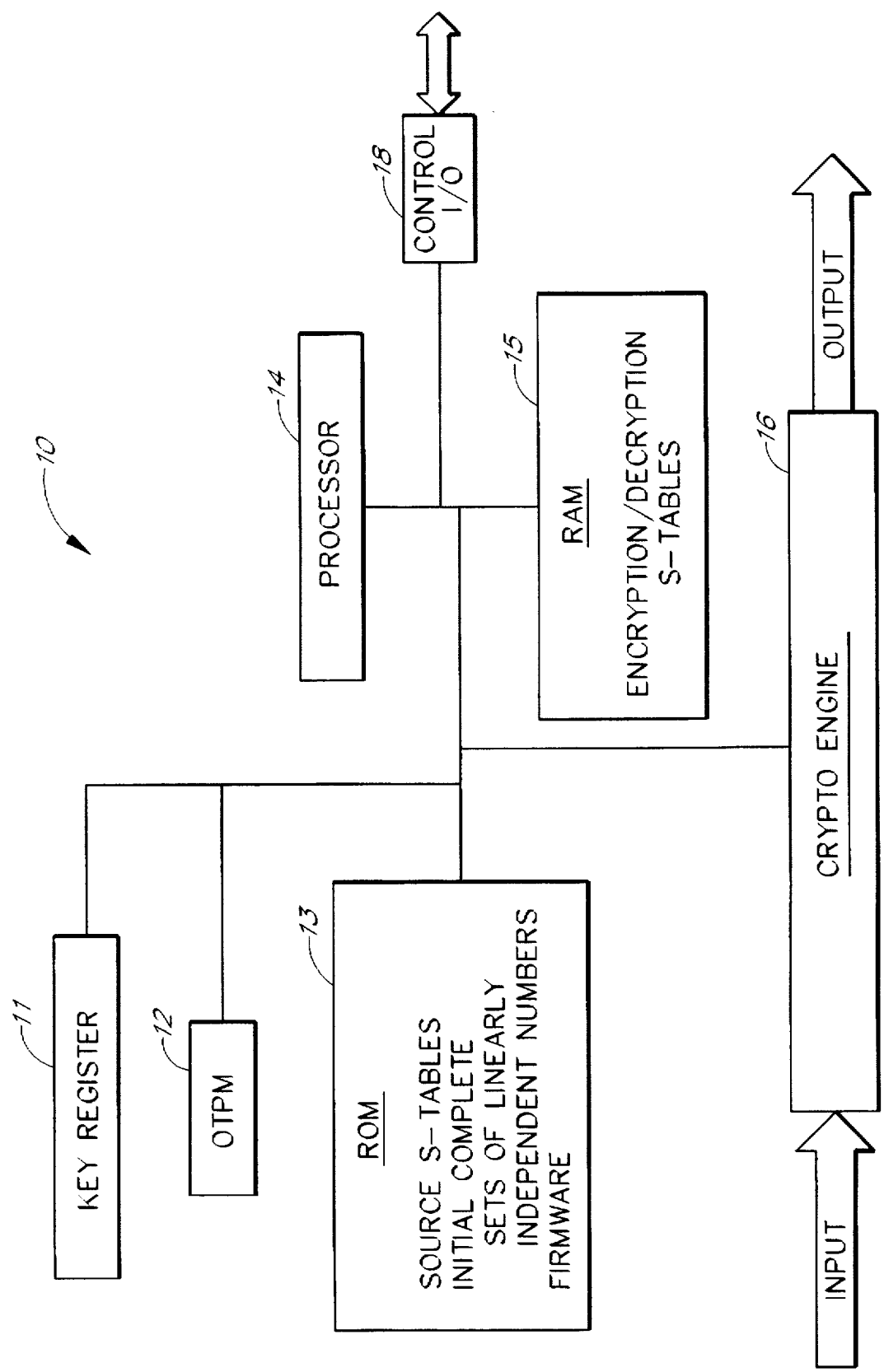
FIG. 1 is a simplified block diagram of a block cipher system that includes a processor.

FIG. 1 illustrates a block diagram of a block cipher encryption system 10 constructed in accordance with the present invention. The block cipher encryption system 10 has a key register 11, into which the current key is placed, and One Time Programmable Memory (OTPM) 12 which is used to store data which, among other possible functions, is used to control the hardware to determine the number of bits accepted into the key register 11 (i.e., it controls the maximum key length that can be used). The block cipher system 10 also has Read Only Memory (ROM) 13 which contains one or more source S-Tables, one or more complete sets of linearly independent numbers to be selected as a first complete set of linearly independent numbers for subsequent modulation by the key, and firmware for the processor 14. The processor 14 can be any standard microprocessor from simple 8-bit processors to more complicated and powerful 64-bit processors currently available. In the present embodiment, an Intel 8051 microcontroller provides the functions executed by the processor 14. Finally, the block cipher system 10 has control I/O 18 to receive and transmit information to external systems. Random Access Memory (RAM) 15 in which generated S-Tables are stored for use by the encryption/decryption hardware, crypto engine 16. The memory (RAM) 15 is also used by the processor 14 for storage of temporary variables. The crypto engine 16 accepts as input either plaintext or ciphertext and delivers as output either ciphertext or plaintext, respectively. The crypto engine 16 embodies any cryptographic algorithm, which uses variable S-Tables generated using the key, as part of its processing to encrypt or decrypt input data. In other words, input data to the crypto engine 16 may be broken into sub-blocks which are used as indexes into one or more S-Tables in RAM 15 to provide substitution sub-blocks which are at the RAM location indexed by the respective input sub-blocks. Which of several S-Tables in RAM 15 is used could depend upon the position of the input sub-block in the overall block of input data to the crypto engine. Accordingly, the substitution sub-block used by the crypto engine 16 for its algorithm is the data contained in the RAM 15 at the location indexed by the input sub-block to the crypto engine 16.

Generating a Complete Set of Linearly Independent Numbers from an Arbitrary String of Bits This section describes a method of using a sub-string of the key stored in the key register 11 to modulate (through selection and XOR operations) a first complete set of linearly independent numbers selected from the one or more complete sets stored in the ROM 13 to obtain a complete new set of linearly-independent numbers. The key is generally received via the control I/O logic 18. The following method makes use of the mathematical theorem that the rank of a matrix is unchanged if a row of the matrix is XORed with any other row of that matrix and the result is used to replace either of the two operand rows. Specifically, with each row of the matrix being one of the n-bit numbers from the complete set of linearly independent n-bit numbers before an XOR operation, then the rows of a matrix resulting from XOR operations with other rows comprise a new complete set of linearly independent n-bit numbers.

In the present embodiment, a series of XOR operations, controlled by an arbitrary string of bits of any length from the "key" stored in the key register 11, transform any complete set of linearly independent numbers stored in the ROM 13, into a new complete set of linearly independent numbers which has been modulated by the key bits. The resulting set of linearly independent numbers are then used to generate S-Tables for the RAM 15.

More specifically, selected bits of the key are used to direct or index a function on the initial set of linearly independent numbers, $N_0$ through $N_7$, such that the result is a modified set of linearly independent numbers through the XOR operations of rows of the matrix of linearly independent n-bit numbers with other rows. Each row of a matrix formed by the set of linearly independent numbers is, in turn, XORed with none to all of the remaining rows in the matrix and is replaced by the result before the next row is modified. The selected key bits are used to indicate whether and what additional rows of the matrix will be XORed with the selected row. For example, assume that the initial set of linearly independent numbers is 8 linearly independent numbers forming a matrix. Seven bits from the key are then selected to guide the operations to be performed on each row of the matrix. Initially, the first row of the matrix is selected for operation. The first seven selected bits of the key dictate which of the remaining 7 rows are XORed with the first row. In other words, 7 arbitrarily selected bits of the key register 11 are assigned to the remaining 7 rows of the matrix. If the corresponding key bit is a 1, the selected operand row will be XORed with the row corresponding to the key bit. If the key bit corresponding to a row is 0, that row will not be XORed with the selected operand row. The resulting operand row will replace the original operand in the matrix. This process may proceed through each of the rows of the matrix acting as the operand row. Preferably, for the second selected operand row, the next 7 bits of the key would be used to indicate which rows will be XORed with the second selected operand row, and so forth. This use of the key bits is what is meant by modulating the complete set of linearly independent n-bit numbers with the bits of the key. In order to obtain even more variety in this process, a number of different complete sets of linearly independent n-bit numbers may be stored in the ROM 13. Then, certain key bits may be used to select one of these complete sets as the initial values for $N_0$ through $N_{n-1}$.

It should be understood that the bits selected from the key to control the operations on the complete set of linearly independent numbers need not be selected consecutively, but could be selected from some selection criteria.

The following steps describe this method, implemented by the processor 14, and stored as instructions in the ROM 13, whereby a sub-string, M, of length m, of a key stored in the key register 11, is used to modulate any complete set of linearly independent n-bit numbers $N_0$ through $N_{n-1}$ stored in the ROM 13. The result is a complete set of linearly independent n-bit numbers, for any m greater than or equal to 0.

Step 1) Set variables, $N_0$ through $N_{n-1}$ to one of the complete sets of n linearly independent n-bit numbers stored in ROM 13, as determined by selected bits in the key register 11.

Step 2) Set a variable, POINTER, to 0.

Step 3) Until POINTER is greater than or equal to m, do the following:

a) Set the (n−1)-bit number variable, PATTERN, to the value of n−1 bits of the key, M, as follows:

For a variable, p, from 0 to n−2 do the following:

If (POINTER+p) is greater than or equal to m, then set $PATTERN_{bit\ p}$ to 1, otherwise, set $PATTERN_{bit\ p}$ to $M_{bit\ (POINTER\ +p)}$.

b) Set a variable, K, to the greatest integer less than or equal to (POINTER/(n−1)).

c) Set $N_K$ to the following:
$N_K \oplus (PATTERN_{bit\ n-2})*N_{(K+1)\ modulo\ n}$
$\oplus (PATTERN_{bit\ n-3})*N_{(K+2)\ modulo\ n}$
$\oplus (PATTERN_{bit\ n-4})*N_{(K+3)\ modulo\ n}$
.
.
.
$\oplus (PATTERN_{bit\ 0})*N_{(K+n-1)\ modulo\ n}$ d) Increment POINTER by (n−1).
(Now use the key bits in reverse order)
Step 4) Set POINTER to m−1.
Step 5) Until POINTER is less than 0, do the following:

a) Set the (n−1)-bit number, PATTERN to the value of n−1 bits of M as follows:

For p from 0 to n−2 do the following:

If (POINTER−p) is less than 0, then set $PATTERN_{bit\ (n-1-p)}$ to 1, otherwise, set $PATTERN_{bit\ (n-1-p)}$ to $M_{bit\ (POINTER\ -p)}$.

b) Set K to the greatest integer that is less than or equal to ((m−1)−POINTER)/(n−1).

c) Set $N_K$ to the following:
$N_K \oplus (PATTERN_{bit\ n-2})*N_{(K+1)\ modulo\ n}$
$\oplus (PATTERN_{bit\ n-3})*N_{(K+2)\ modulo\ n}$
$\oplus (PATTERN_{bit\ n-4})*N_{(K+3)\ modulo\ n}$
.
.
.
$\oplus (PATTERN_{bit\ 0})*N_{(K+n-1)\ modulo\ n}$ d) Decrement POINTER by (n−1).

At the completion of these Steps, $N_0$ through $N_{n-1}$ comprise a new complete set of linearly independent n-bit numbers which have been modulated by the key variable. A block-wise reverse order processing of the bits of M (Steps 4 and 5) is used as well as the forward order processing (Steps 1 through 3) in the example to eliminate the bias that results from processing the n-bit numbers in only one direction across the key—i.e., the beginning key bits having much more effect upon the final result than the ending key bits. The bias resulting from processing the key bits in only one direction could also be alleviated by using a number of bits near the end of M in some manner to determine which of several complete sets of linearly independent n-bit numbers, stored in ROM 13, is selected for the initial values of $N_0$ through $N_{n-1}$. Furthermore, in those block cipher systems using more than one S-Table, allocation of the bits of the key register 11 to generate the multiple S-Tables can alleviate the above-described bias. In other words, selection of different bits from the key to be the beginning bits for processing for each separate set of linearly independent n-bit numbers would be one way of reducing the bias if processing in both directions is not used.

An optimal use of key bits suggests that m=n*(n−1) in the above described method to generate a complete linearly independent set of n-bit numbers. It can be shown that for m=n*(n−1), Steps 1 through 3 result in $2^m$ different ordered complete sets of linearly independent n-bit numbers. That is, two keys each n*(n−1) bits in length which differ by only one bit will result in two different ordered complete sets of linearly independent n-bit numbers. The order of the set of numbers is significant because of how the complete set is used, as described in Generating Substitution Tables from a Source Table and a Complete Set of Linearly Independent Numbers. In other words, all of the information contained in n*(n−1) key bits is used by the process described in Steps 1 through 3. The total number of different, ordered, complete sets of linearly independent n-bit numbers is greater than $2^{n*(n-1)}$ but significantly less than $2^{n*n}$. Hence, the process described in Steps 1 through 3 does not use all of the information contained in n*n key bits.

Data stored in the OTPM 12 determines how many bits the key register 11 is allowed to receive from an external source by programming this number into the OTPM 12 at the time the block cipher system is manufactured. The processor 14 reads the information from the OTPM 12 and limits the bits which can be loaded into the key register 11 to the number specified in the OTPM 12. If the device is configured to allow less than the maximum capacity of bits of the key register 11, the remainder of the key register 11 can be filled by reusing (expanding), in some manner, the bits received. Then the method described above, which uses the full key register 11, can be used to generate the required number of complete sets of linearly independent numbers. Furthermore, this allows a device with a longer key length capability (domestic use only, for example) to be configured to communicate with a device of shorter key length (exportable). The expansion of the key bits is preferably in accordance with a non-linear function, as opposed to simply copying the key bits. The non-linear source tables stored in ROM may be used for such non-linear function. Such methods of expanding keys are known in the art.

Generating Substitution Tables from a Source Table and a Complete Set of Linearly Independent Numbers This section describes a method whereby a new n-bit encryption S-Table, E, and/or decryption S-Table, D, to be stored in the RAM 15, is generated from a source S-Table, R, stored in ROM 13, and the n linearly independent numbers $N_0$ through $N_{n-1}$, which are generated as described above. $N_{n-1}$ through $N_0$ are used as rows of an n×n matrix, whose rank is n, where $N_{n-1}$ is the top row and $N_0$ is the bottom row. Treating each n-bit index to and corresponding n-bit number from the source S-Table to be transformed as n-element "row" vectors and multiplying each such n-element vector by the matrix, where the "addition" operation is the XOR operation, results in a linear transformation, T, of the n-bit numbers of the source S-Table. In order to treat the n-bit number to be transformed as a row vector, requires that the linearly independent numbers, $N_{n-1}$ through $N_0$, be used as a matrix for "right multiplication" of that row vector. In (eq. 1), below, F is an n-bit number determined from bits of the key register 11. For instance, F may simply be a number of bits selected from the key register or a number of bits selected according to a non-linear function of some key bits. The operation using F is used to give more variety in the resulting S-Table. For some of the source S-Tables, the number chosen for F changes the cycle structure of the resulting S-Table from the source S-Tables. If F is not 0, the resulting S-Table will be an "affine" transformation of the source table, and in that case, certain algebraic structures, such as the number of fixed points and the number and lengths of cycles, will not be preserved in E or D by the transformation of R. For purposes of this and the following descriptions, the label, T, will be applied to both the linear transformation and the matrix which, when used as a right multiplier, results in the linear transformation, T.

In essence, for each value, K, from 0 through $2^n-1$, two values are generated:

$$X=T(K),$$

(i.e., the vector K is right multiplied by the matrix of linearly independent number $N_{n-1}-N_0$)
and $$Y=T(R[K]\oplus F). \qquad (eq. 1)$$

(i.e., the vector formed by the contents of R indexed by K and XORed with F is right multiplied by the matrix of linearly independent numbers $N_{n-1}N_0$)

The encryption S-Table, E, is generated by using the value, X, as index to E and the value, Y, as the contents of E at that index. The decryption S-Table, D, is generated by using the value, Y, as an index into D and the value, X, as the contents of D at that index.

The following Steps describe the method in detail:

For every n-bit number, K, from 0 to $2^n-1$, do the following:

Step 1) Set n-bit variable, V, to R[K]⊕F.

Step 2) Set n-bit variable, X, to $$(K_{b\#\ n-1})^*N_{n-1}\oplus(K_{b\#\ n-2})^*N_{n-2}\oplus\ldots\oplus(K_{b\#\ 0})^*N_0.$$

Note that $K_i$ will be either a 0 or a 1, so that the bits of K indicate the combination of the linearly independent numbers XOR-summed to determine X.

Step 3) Set variable, Y, to $$(V_{b\#\ n-1})^*N_{n-1}\oplus(V_{b\#\ n-2})^*N_{n-2}\oplus\ldots\oplus(V_{b\#\ 0})^*N_0.$$

Note that $V_i$ will be either a 0 or a 1, is that the bits of V indicate the combination of the linearly independent n-bit numbers XOR-summed to determine Y.

Step 4) Set E[X] to Y, and set D[Y] to X.

Generating Substitution Tables from One or More Source Tables and an Arbitrary Key Without a Microprocessor The following paragraphs describe a discrete processor implementation 100 which can use an arbitrary key, M, of arbitrary length, m, to modulate an initial complete set of linearly independent n-bit numbers with the result being a complete set of linearly independent n-bit numbers. This implementation, diagrammed in FIG. 2, can also generate and store an encryption S-Table, E, and/or a decryption S-Table, D, based upon a transformation using the complete set of linearly independent n-bit numbers resulting from the key modulation, and an n-bit source S-Table, R, stored in a memory (such as ROM 13). The hardware implementation 100 shown in FIG. 2, in essence, replaces the processor 14 in FIG. 1 and its firmware stored in ROM 13. For simplification, a value of 8 is selected for n, although an expansion of the architecture shown in FIG. 2 could be used for any value of n.

In general, the discrete processor implementation 100 comprises control logic 102 (note that the control logic 102 has been reproduced in FIGS. 2A and 2C for simplicity of illustration), a counter 108 (FIG. 2A), a ROM 110 (FIG. 2A), a storage register 112 (FIG. 2A), a multiplexer 114 (FIG. 2A), a key 120 which originates from the key register 11 (FIG. 1), a set of registers 104 (FIG. 2B), a multiplexer 106 (FIG. 2B), an XOR network 113 (FIG. 2B), an address register 132 (FIG. 2C), a data register 138 and an address selection multiplexer 139. It will also be noted that the memory 15 in FIG. 1 is reproduced in FIG. 2C for simplification of illustration.

The discrete processor implementation 100 operates in two modes. The first mode generates the wets of linearly independent n-bit numbers, and the second mode generates the entries for the encryption and decryption S-Tables to be stored in the memory 15. In the first mode of operation of the circuit 100, it modulates an initial complete set of 8 linearly independent 8-bit numbers. The registers 104, B0 through B7, are loaded from external memory such as the ROM 13 with an initial set of linearly independent values, $N_7-N_0$, by shifting those values in through the IN input to the multiplexer 106 and via data in, DI, lines 107, in a byte parallel fashion, while the shift select control 109, SS, is set to 1 and the shift control 111, SH is set to 1. {Note that the initial values in B0 through B7 correspond to the initial values for $N_7$ to $N_0$, respectively stored in the ROM 13, as discussed in the embodiment of FIG. 1. The numbers are used to obtain a complete set of linearly independent n-bit numbers. Advantageously, the initial values for $N_7$ to $N_0$ to be used in a particular instance are selected from a number of complete sets of linearly independent n-bit numbers stored in the ROM 13, where the selection is determined by selected key bits. For instance, the last few bits or a selected number of bits from somewhere in the key can be used to indicate the starting point of linearly independent n-bit numbers stored in the ROM 13, the set of linearly independent n-bit numbers $N_7-N_0$ being the 8 numbers in sequence in the ROM 13 from the starting point indicated by the selected key bits.} SS 109 is switched to 0 for the remainder of the process to select the XOR network 113 result, and the multiplexer control 115, G, is set to 1 to select the bits of the sub-string M as the M' control inputs to the XOR network 113.

In each subsequent clock period, the "next" n−1 (in this example, seven) bits of M, along with a fixed bit, are used as $M_7-M_0$ through the multiplexer 114 to selectively enable the corresponding byte, B1 through B7 in the XOR network 113 (the enable bit $M_7$ associated with byte B0 is always a logic '1'). The result of the XOR network 113 is loaded into B7 while, on the same clock edge, bytes B1 to B7 are shifted "up" so that the data in B1 moves to B0 (where B1 will be the byte to be replaced in the next operation based on the values in the "next" 7 bits of M), B2 moves to B1, etc. Note that, at the end of the clock period, the original value contained in B0 is simply overwritten with the value contained in B1. The original value contained in B0 is, however, one of the operands in the XOR-sum whose result is stored in B7 at the end of the clock period.

This process continues until the last of the bits of M, the key 120, are used. If the number of bits of M is not evenly divisible by n−1, then the remaining bits are padded with logic "1" as needed for the last iteration. The process is then repeated by traversing the bits of M in the opposite direction, again in groups of n−1. The resulting numbers are a complete set of n, linearly independent n-bit numbers which are used in transformation operation.

In the second mode of operation, that of generating the entries for the encryption, E, and decryption, D, S-Tables to be stored in RAM 15, the RAM address select control 131, AS, is set to 1 to pass the generated RAM addresses, and the registers B0 through B7 104 are held constant (SH=0) since they are already loaded with the complete set of n, linearly independent n-bit numbers to be used as the transformation. The multiplexer 114 control 115, G, is set to 0 since the bits of M are not used in this mode.

The basic operational flow is to generate an address and corresponding data value for each location of the Encryption E (or Decryption D) S-Table in the RAM 15, and then to write to the memory 15. In both operations, all address locations from $0-2^n-1$ are generated, so every location in both the Encryption E and Decryption D tables is loaded.

The operation to generate values for the encryption S-Table E, proceeds as follows. On a clock edge, the counter 109 is incremented to the next K by pulsing the Count control line 124 (if this is the first time, the counter 108 is reset to 0 by the control logic 102 by pulsing the Reset control line 126), and the ROM select control 128, RS, is set to 0 to select the 8-bit counter value K, which passes through the multiplexer 114 to become $M'_7$ through $M'_0$. This enables the appropriate bytes of B0 through B7, respectively, into the XOR network 113. The 8-bit result, $RSLT_7$ through $RSLT_n$, is stored as the RAM address, X, by enabling EA 130 of the Address Register 132. On the next clock, RS 128 is switched to 1, passing $V=R|K|\oplus F$ (via the XOR gate 134 fed by the source S-Table ROM 110 and the F register 112) through the 8-bit multiplexer 114 to become $M'_7$ through $M'_0$, and on through the XOR network 113, where the result, $RSLT_7$ through $RSLT_0$, is stored as the RAM data, Y, by enabling ED 136 of the Data Register 138. Finally, the Encryption RAM, E, is written (E[X] (set to Y) on the next clock, requiring the RAM to be strobed with STB 140 while the R/W line 142 is in the write mode. This process continues until the counter 108 cycles through all value of K (from 0 through 255 in the present embodiment). There are of course many ways to implement this operation in logic. A straightforward implementation is shown for ease of understanding.

If loading the Decryption RAM, D, instead of the Encryption RAM, E, then the change to the above operation is to reverse the order of the enabling of the Address Register 132 and Data Register 138 (i.e., when RS equals 0, enable ED instead of EA, and when RS equals 1, enable EA instead of ED). The effect of this reversal is to swap the address and data words X and Y before writing to the RAM (D|Y| set to X).

Generating Substitution Tables from One or More Source Tables and an Arbitrary Key, Using a Processing Effort Comparable to that Required to Encrypt One Plaintext Block, Without a Processor or an Encryption or Decryption RAM The embodiments described above set forth methods by which a temporary n-bit encryption S-Table, E, and a temporary n-bit decryption S-Table, D, can be generated, and stored in memory, from some n-bit source S-Table, R, and an arbitrary string of key bits from a key. In effect, the key bits are used to generate an n-bit linear transformation, T, and then E is generated by transforming each index value, K, and the source S-Table $R_E$, to get $$U=T(K)$$

and then storing in E, at that index value, U, (i.e., E|U|), the value, $$T(R|K|\oplus F),$$

where U, K and F are n-bit numbers.

If the inverse transformation of T, $T^{-1}$, is determined, it is possible to obtain a substitution value based on E, for any input value, U, on an "as needed" basis without generating E. Because T is a linear transformation of the n-bit numbers onto the n-bit numbers, there must be some n-bit value, K, such that T(K)=U, or expressed in terms of $T^{-1}$, $K=T^{-1}(U)$. Then, $$E[U]=T(R[T^{-1}(U)]\oplus F).$$

That is, the value, U, for which a substitution is sought, is first transformed by $T^{-1}$ into the value, K, which is then used as an index into the source S-Table, R, to obtain a value which is then XOR-summed with F, the result of which is then transformed by the T transform into the value that is substituted for the original value, U. Note that E never needs to be generated, nor does it need to exist in memory. Rather, the substitution affected by E is computed for each value, U, on an "as needed" basis using $T^{-1}$, R and T.

To perform a similar process in the decryption direction requires that there be a source S-Table, $R_D$, stored in ROM, which expresses the mapping that is the inverse to that expressed by R—i.e., for all n-bit values, K, $K=R_D[R[K]]$. For the sake of clarity, the source table in ROM used for encryption shall be referred to as $R_E$ rather than R.

Then, for any n-bit value, U, there is an n-bit value, K, such that U=T(K) and $K=T^{-1}(U)$, and $$D[U]=T(R_D[T^{-1}(U)\oplus F]).$$

Because, under the XOR operation, T is a linear transformation then, $T(U\oplus V)=T(U)\oplus T(V)$. Thus, for all n-bit values, U, $$D[E[U]] = D[T(R_E[T^{-1}(U)] \oplus F)] = T(R_D[T^{-1}(T(R_E[T^{-1}(U)] \oplus F)) \oplus F])$$
$$= T(R_D[T^{-1}(T(R_E[K] \oplus F)) \oplus F]) = T(R_D[T^{-1}(T(R_E[K]) \oplus T(F)) \oplus F])$$
$$= T(R_D[T^{-1}(T(R_E[K])) \oplus T^{-1}(T(F)) \oplus F]) = T(R_D[R_E[K] \oplus F \oplus F])$$
$$= T(K)$$
$$= U.$$

That is, D affects a substitution mapping that is the inverse of the substitution mapping affected by E.

Figure 2:
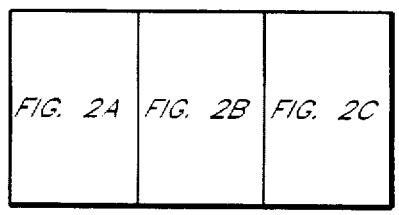
FIG. 2 is a logic flow diagram for a hardware implementation for a block cipher system in a monolithic device that does not require the use of a microprocessor.
Figure 2A:
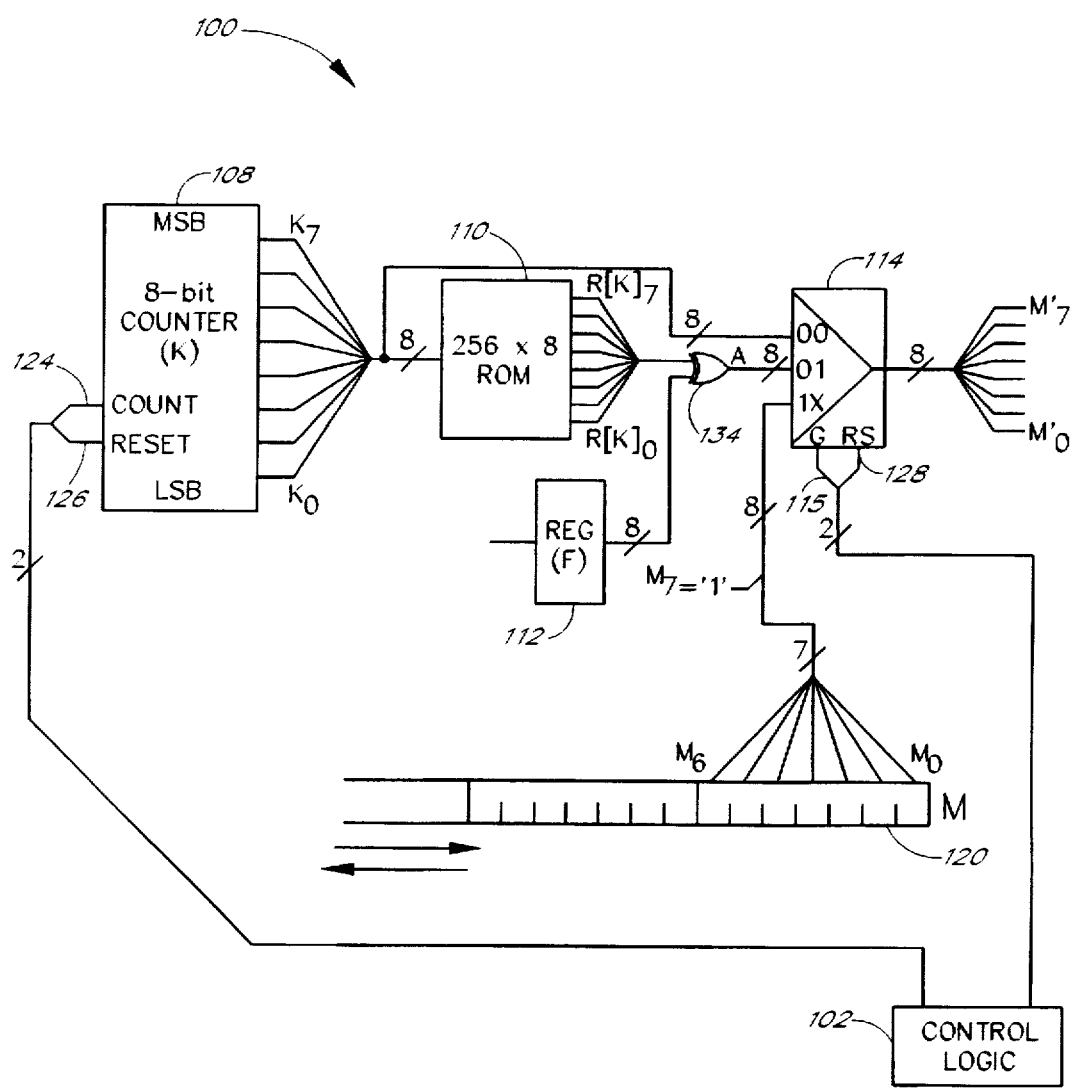
Figure 2B:
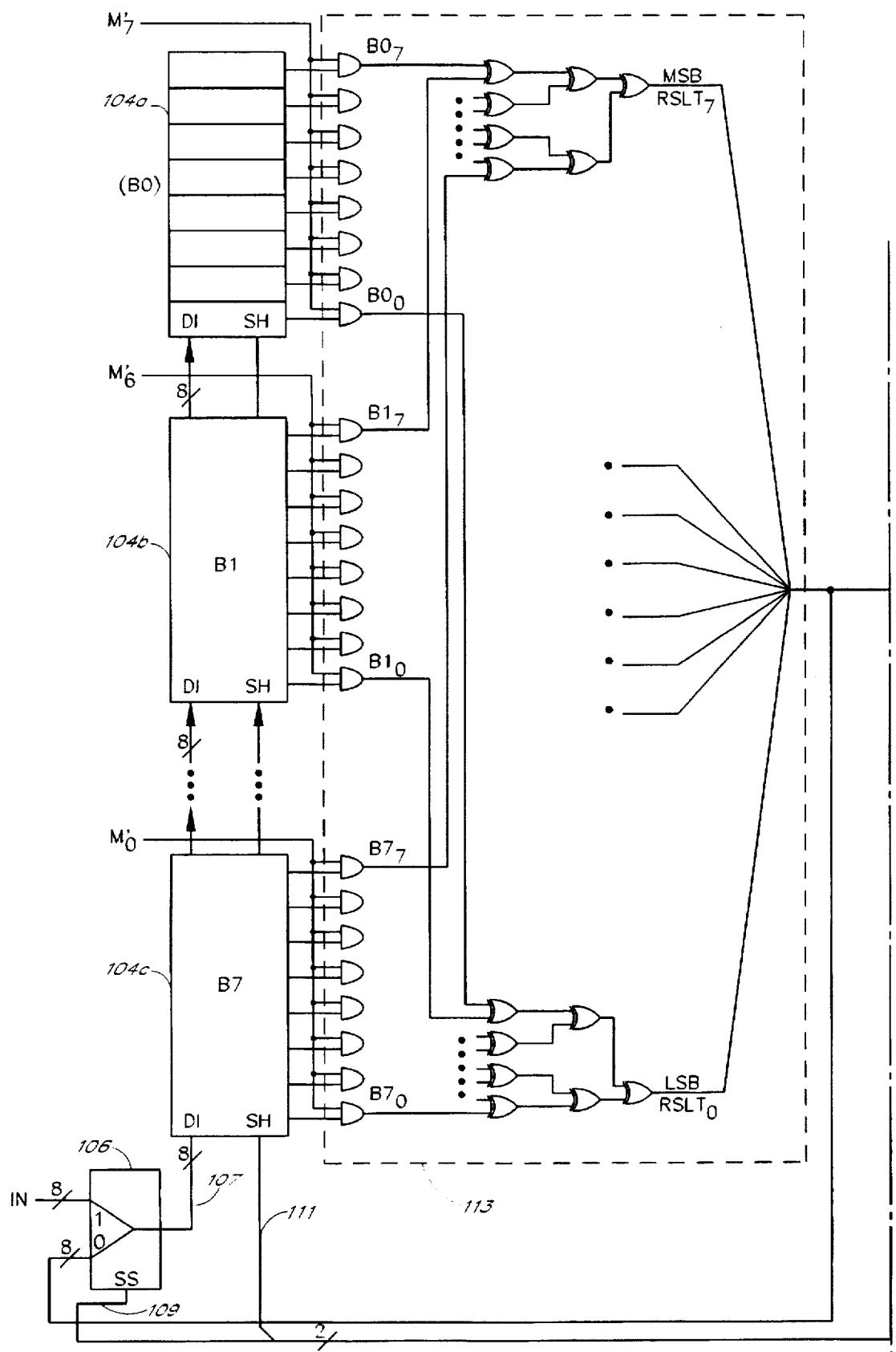
Figure 2C:
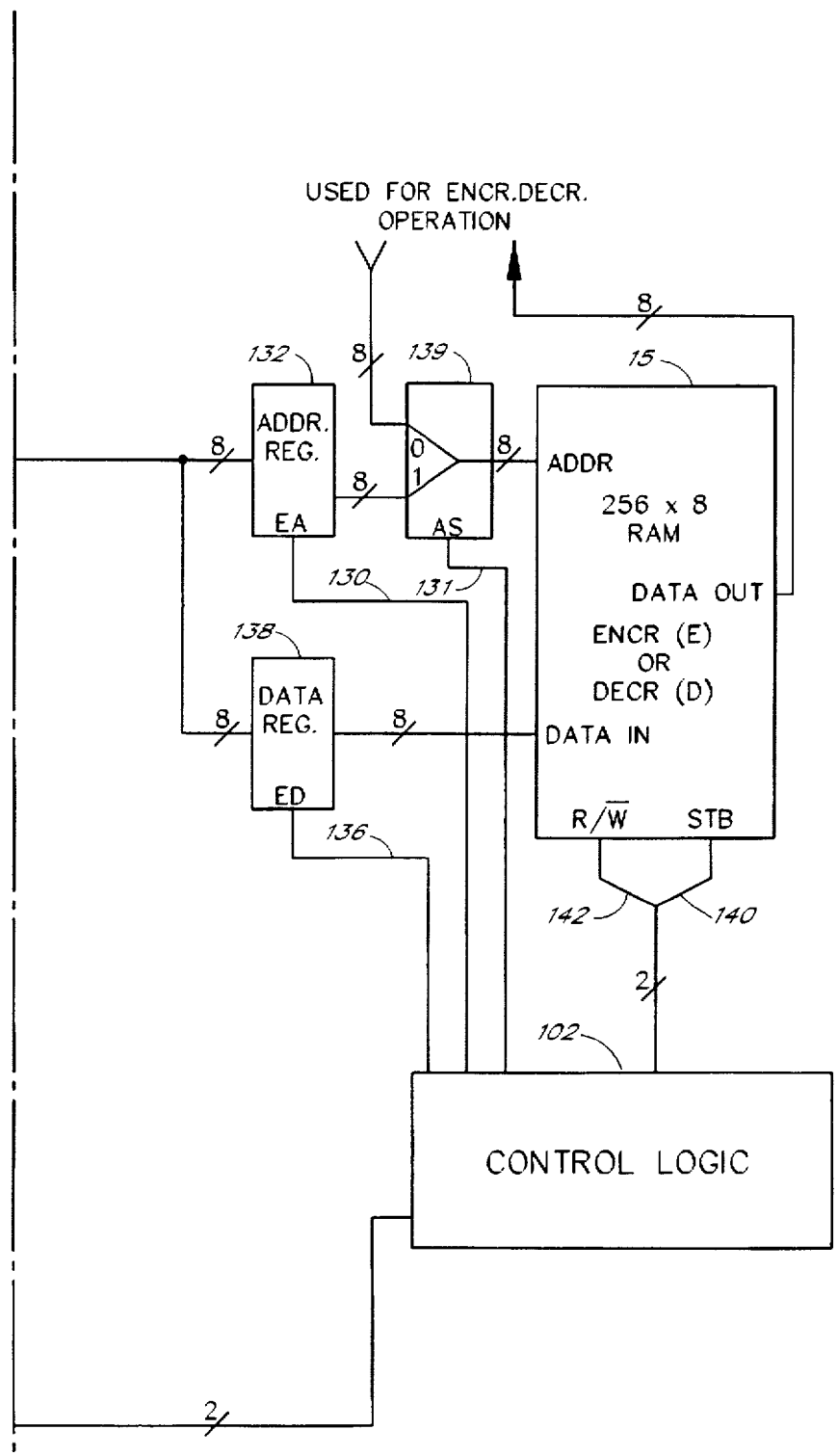

For secure systems, key changes are effected periodically to minimize the possibility of cryptanalysis. In the embodiments of FIGS. 1 and 2, each time a new key is received, new S-Tables must be generated as described in those embodiments, resulting in significant processing overhead to generate the new S-Tables. If $T^{-1}$ is determined concurrently and with the same amount of processing as required to determine T, the processing required to affect a key change for the system, per an encryption or decryption S-Table, would be substantially reduced from that required by the embodiments of FIGS. 1 and 2. For n-bit numbers, the embodiment shown in FIG. 2 and described above, would require at least $2*n+n^2$ clocks to generate E in RAM, and twice as long to generate both E and the decryption S-Table, D. The implementation described in the following paragraphs concurrently generates T and $T^{-1}$ in $2*n$ clocks. The process of determining an encryption or a decryption substitution for a given value, U, requires one clock.

If the key bits in M are processed in both the forward and reverse directions, and if the size of M in bits is $m=n*(n-1)$, then the hardware implementation shown in FIG. 3, operated in the mode where bits from M are used in both XOR networks, can determine both T and $T^{-1}$, concurrently, in $2*n$ clocks. Restrictions are placed on the size and processing of M only for the purposes of simplifying the description of the embodiment.

Essentially, both T and $T^{-1}$ are generated by applying elementary row operations to the identity matrix, except that the elementary row operations applied to generate $T^{-1}$ are those used to generate T but applied in reverse order. That is, T is generated by starting with the identity matrix—i.e., the matrix whose rows are $N_{n-1}=2^{n-1}$, $N_{n-2}=2^{n-2}$, ..., $N_0=2^0$, and then row manipulating that matrix according to the bits of M, starting with $N_{n-1}$ and working to $N_0$, as discussed in the previous embodiment $T^{-1}$ is generated, concurrently, by starting with the identity matrix and then row manipulating that matrix, using the bits of M in an (n-1)-bit, block-wise order which is in reverse to that used for T and starting with $N_0$ and working up to $N_{n-1}$.

A well known theorem in linear algebra states that any sequence of elementary row operations that reduces an n×n matrix, A, to the n×n identity matrix, also transforms the identity matrix to $A^{-1}$. Note that if the processing described in the previous paragraph to generate the matrix for $T^{-1}$ were applied to the T matrix, the identity matrix would result. This is because in the mathematical field of n-bit numbers where addition is the XOR operation, each n-bit number is its own additive inverse—i.e., X⊕X=0. As a corollary of this fact, if $$X_1 = X_1 \oplus a_2*X_2 \oplus a_3*X_3 \oplus \ldots \oplus a_n*X_n,$$

where $a_i = 1$ or 0, then $$X_1 \oplus a_2*X_2 \oplus a_3*X_3 \oplus \ldots \oplus a_n*X_n =$$

-continued
$$(X_1 \oplus a_2*X_2 \oplus a_3*X_3 \oplus \ldots \oplus a_n*X_n) \oplus a_2*X_2 \oplus a_3*X_3 \oplus \ldots$$
$$\oplus a_n*X_n = X_1 \oplus a_2*X_2 \oplus a_2*X_2 \oplus a_3*X_3 \oplus a_3*X_3 \oplus \ldots$$
$$\oplus a_n*X_n \oplus a_n*X_n = X_1,$$

because $$a_i*X_i \oplus a_i*X_i = 0.$$

In other words, for n×n matrices whose entries are 0 or 1 and where the additive operation is the XOR operation, an elementary row operation is its own inverse operation. This result does not hold generally for n×n matrices. Based on the above and treating each row of the matrix for T as an n-bit number, perform the last row manipulation on T results in the matrix, $T_{n-1}$, that resulted after the second to last row manipulation; performing the second to last row manipulation on $T_{n-1}$ results in the matrix, $T_{n-2}$, that resulted after the third to last row manipulation; etc.; and performing the first row manipulation on the matrix that resulted after the first row manipulation of the identity matrix, results in the identity matrix. Hence, applying those row manipulations to the identity matrix results in $T^{-1}$.

FIG. 3 diagrams a block cipher system 200 which in one mode generates T and $T^{-1}$ and in a second mode encrypts or decrypts a particular value, U. To simplify FIG. 3, a value of 8 is used for n, although an expansion of the hardware implementation shown in FIG. 3 could be used for any value of n. The two XOR networks 202, 204 in FIG. 3 have the same structure. Hence, if the processing throughput requirements of a particular application allow, a single XOR network could be time-multiplexed to generate both T and $T^{-1}$, and then to encrypt or decrypt U. In order to achieve the reverse order processing of the identity matrix in the first XOR network 204, the B0 through B7 registers 206 are loaded with the identity matrix in reverse order—i.e., $B0=2^0$, $B1=2^1$, $B2=2^2$, ..., $B7=2^7$—and seven bits from the key M 198, and the fixed bit, M'$_7$, are mapped to the eight input lines 208 to the first XOR network 204 as follows:

M'$_7$ to M"$_7$
M'$_0$ to M"$_6$
M'$_1$ to M"$_5$
. (Mapping One (logic 201))
.
.
M'$_6$ to M"$_0$.

This mapping occurs via the "mapping one" logic 201 and selecting the "1" input to the multiplexer 203 via the multiplexer select line G 216. This directs the mapping from the key to the M" inputs to the XOR network 204.

The second XOR network 202 is loaded with the identity matrix in normal order—i.e., $B'0=2^7$, $B'1=2^6$, $B'2=2^5$, ..., $B'7=2^0$—and the same seven bits from M, and the fixed bit, M'$_7$, are mapped to the eight input lines 210 to the second XOR network as follows:

M'$_7$ to M^$_7$
M'$_6$ to M^$_6$
M'$_5$ to M^$_5$

(Mapping Two (logic 205))

M'₀ to M"₀.

Figure 3A:
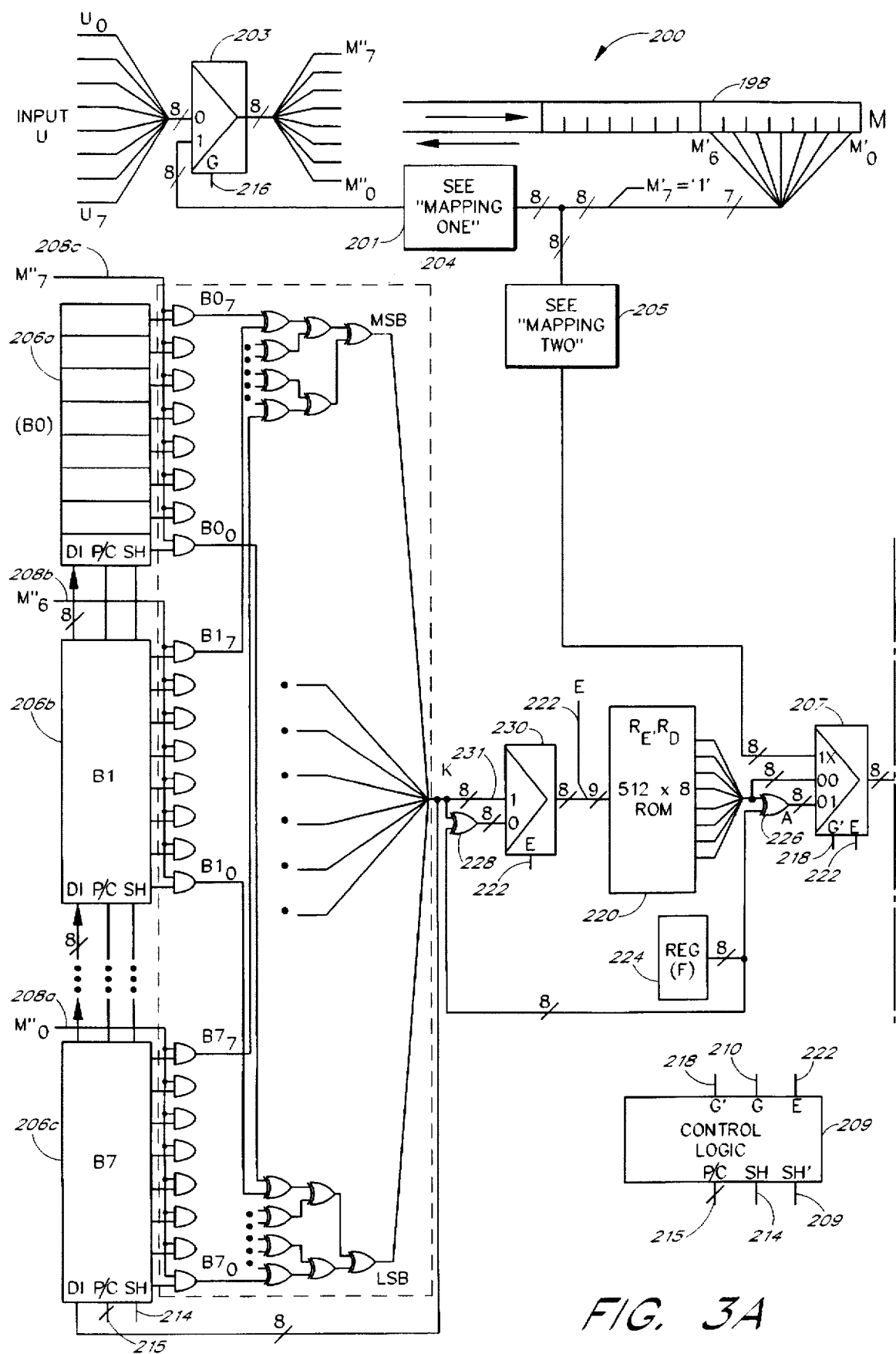
FIG. 3 is a logic flow diagram for a hardware implementation for a block cipher system which generates a variable S-Table, on an as needed basis, from a key variable, as a linear transformation of a fixed S-Table, in an amount of time that is roughly comparable to the time required for a hardware-implemented DES-like block cipher system to encrypt one 64-bit block of plaintext.

This mapping performed by the "mapping two" logic 205 through the multiplexer 207 which is selected to pass the "mapping two" outputs to the M^ inputs of the XOR network 202. Although the control logic 209 is depicted in FIG. 3A, the individual signal line connections are not shown for clarity in the Figure. The control logic 209 provides the necessary timing for system 200.

The following paragraphs describe the operation of the circuit 200 shown in FIG. 3. In the first mode of operation, used to generate two 8×8 transformation matrices, T and $T^{-1}$, the B0 through B7 registers 206 are loaded in one clock with 1, 2, 4, 8, 16, 32, 64 and 128, respectively, and the B'0 through B'7 registers 212 are loaded with 128, 64, 32, 16, 8, 4, 2 and 1, respectively. The registers 206 and 212 are loaded by using the preset/clear lines 215. The preset and clear lines 215 for each of the flip-flops which make up the B registers are connected such that the respective flip-flops are either preset to "1" or cleared to "0" such that the B registers are loaded with the correct number. In other words, one flip-flop in each register will be preset to "1" and the other flip-flops for that register will be cleared to "0" initially. The particular flip-flop that is preset to "1" will be selected such that the number in the register is the appropriate loaded number set forth above. Then the shift controls SH 214 and SH'. 216 are set to "1", for the remainder of the process to select the XOR networks 204, 202 result, and multiplexer controls 216, 218, G and G', are each set to "1" to select the substring of bits M'₀ through M'₆ from the Key M 198 as the M" and M^ control inputs to the first and second XOR networks 204, 202, respectively.

The operational flow is under the control of control logic 209, and is as follows. In each clock period, the "next" n−1 (in this example, seven) bits of M 198 are used to selectively enable the corresponding bytes B1 through B7 and B'1 through B'7 in the XOR networks 204, 202 (the enable bits M"₇ and M^₇, associated with byte B0 and B'0, respectively, are always a logic '1'). The result of the first and second XOR networks 204, 202 are loaded into the B7 register 206c and B'7 register 212c, respectively, while, on the same clock edge, bytes B1 through B7 and B'1 through B'7 are shifted "up" so that the data in the B1 register 206b moves to the B0 register 206a and the data in the B'1 register 212b moves to the B'0 register 212a (where B1 and B'1 will be the bytes to be replaced in the next operation based on the values in the "next" 7 bits of M 198), the contents of the B2 register move to the B1 register, and the contents of the B'2 register move to the B'1 register, etc. Note that, at the end of the clock period, the original value contained in the B0 register 206a is simply overwritten with the value contained in the B1 register 206b. The original value contained in the B0 register 206a is, however, one of the operands in the XOR-sum result stored in the B7 register 206c at the end of the clock period. Similarly, the original value contained in the B'0 register 212a is overwritten with the value contained in the B'1 register 212b, but is one of the operands in the XOR-sum whose result is stored in the B'7 register 212c.

This process continues until the last of the bits of the key M 198 are used. To simplify the discussion, it has been assumed that the number of bits in M 198 is n*(n−1), or in his example, 56. The process is then repeated by traversing the bits of M 198 in the opposite direction, again in 8 groups of 7 bits each.

In the second mode of operation, generating a substitution for some value, U, the multiplexer controls 216, 218, G and G' are each set to 0 to pass the bits of the input value, U, to the first XOR network 204 and, the output of the appropriate ROM source table 220, $R_E$ or $R_D$. To the second XOR network 202, rather than the bits from M 198. The B0 through B7 registers 206 and B0' through B7' registers 212 are held constant (SH=0 and SH'=0), since they are already loaded with $T^{-1}$ and T, respectively. Finally, if the device is encrypting, the encryption control line 222, E=1 so that F as contained in the F register 224 is XORed using the XOR gate 226 with the output from ROM 220, but not with the input or address to the ROM 220; if the device is decrypting, E=0 so that F is XORed using XOR 228 with the input or address to ROM 220 as selected by multiplexer 230, but not with the output from ROM 220. As discussed below, the E signal line 222 is also used to select whether $R_E$ or $R_D$ is used for the input to the second XOR network 202.

Two versions of the ROM source substitution table are stored, one for encryption, $R_E$, and one for decryption, $R_D$. When a resulting substitution value for some value, U, is sought in the encryption mode, $R_E$ is used as a source substitution table and when in the decryption mode, $R_D$ is used as a source substitution table, either substitution table being appropriately transformed. Both tables can be stored in the same physical ROM 220 by using the highest order address bit to select between the two. As seen in FIG. 3A, the encryption control line 222, E, is provided as an independent input to the ROM 220 as the highest order address bit input to the ROM 220. If E=1, then a value from $R_E$ is used as the input to the second XOR network 202. Otherwise, a value from $R_D$ is used. In the encryption mode, in one clock period, U is transformed by $T^{-1}$, contained in the B7 through B0 registers 206 of the first XOR network 204, into the value, K on signal lines 231, which is used as an index into the selected ROM encryption S-Table, $R_E$, the output of which is XORed with some value, F, and the result used as the input to the second XOR network 202 whose B'0 through B'7 registers 212 contain T. The output from the second XOR network 202 is the resulting substitution, E[U], for U. Note that, as shown in FIG. 3A, the bits of U are mapped to the M" signal lines as follows:

$U_0$ to $M"_7$
$U_1$ to $M"_6$
$U_2$ to $M"_5$
$U_3$ to $M"_4$
$U_4$ to $M"_3$
$U_5$ to $M"_2$
$U_6$ to $M"_1$
$U_7$ to $M"_0$

This reverse mapping is used use, since the identity was loaded in B0–B7 registers 206 in reverse order, the result after the key modulation will be $T^{-1}$ with its rows in reverse order.

In do decryption mode, in one clock period, U is transformed by $T^{-1}$, contained in the B0 through B7 registers 206 of the first XOR network 204, into the value, K on signal lines 231, which is XORed using XOR gate 228 with the same value, F, as used for encryption, the result of which is used as an index into the selected ROM decryption S-Table, $R_D$, the output of which is used as the input to the second XOR network 202 whose B'0 through B'7 registers: 212 contain T. The output from the second XOR network 204 is the substitution, D[U], for U.

Figure 4:
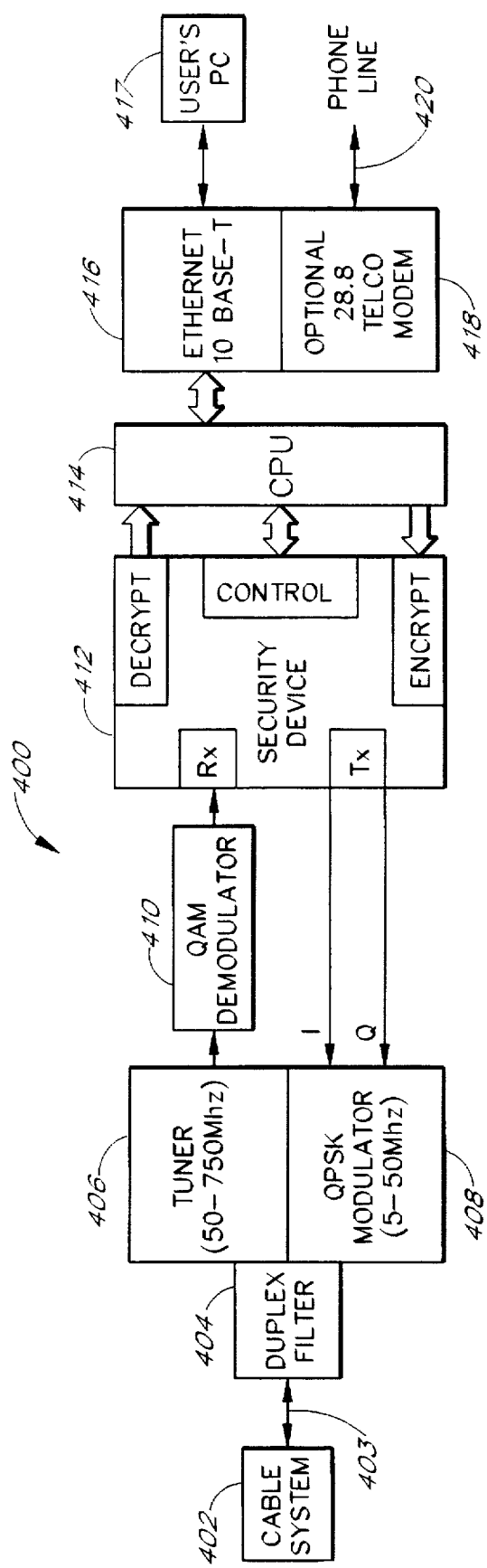
FIG. 4 is a block diagram of an application of the block cipher system of the present invention in a cable modem.

As explained above, the crypto system of the present invention has application in any digital data system. One example, for cable modems communication, is depicted generally in FIG. 4. A cable modem is a device which can receive, and optionally send, high-speed digital data through television cable (CATV) networks which are capable of delivering digital data. As depicted in FIG. 4, the use of the present invention in a cable modem 400 connected to cable system 402 involves a duplex filter 404, a tuner 406, a Quadrature Phase Shift Keying (QPSK) modulator 408 a Quadrature Amplitude Modulation (QAM) demodulator 410, a block cipher security system 412 complying with the present invention, a processor 414, and a network interface such as an Ethernet interface 416 coupled to a computer 417, and optionally a conventional telephone line modem 418 connected to the telephone lines 420.

The cable modem system 400 receives data frames from the downstream RF channel 403 from the cable system 402. The received frames, after qualification and processing, are delivered to the computer 417 via the network interface 416. In the depicted embodiment, the network interface advantageously comprises a 10Base-T ethernet interface. Data received from the computer 417 ("client") (through the interface 416) is formatted and returned upstream via the upstream modulator 408. The modem can return data received from the client 417 via the optional modem 418. This option provides the user tee benefit of hi-speed downstream data delivery when the user is using a "One Way" cable plant (i.e., there is no upstream ability in the cable system 402).

For data from the Cable System 402, the RF signal arrives at the duplex filter 404 which provides high-pass filtering. The signal is then delivered to the tuner 406. The tuner selects the RF channel of interest and delivers the selected intermediate frequency (IF) signal to the QAM demodulator 410. The QAM demodulator 410 demodulates the IF signal, providing synchronization, error detection/correction and outputs parallel data to the receiver portion (the receive buffer Rx) of the Security Device 412. The security device 412 decrypts the received data, if necessary, and based on conditional access functionality contained in the security device 412, and conditional access control information received in the downstream data, delivers the decrypted data to the processor 414. The processor 414 is responsible for reassembling the received packets of data and, after additional qualification, signals the ethernet controller to send the packet(s) to the computer 417.

For data to be sent upstream, the processor 414 formats the data received from the computer 417 for transmission via the QPSK modulator 408 or via the optional modem 418. The processor then passes the data packet(s) to the security device 412 for encryption. The security device 412 then passes the packets to the QPSK modulator 408, to the duplex filter 404, and then to the cable system 402. If the packet is to be sent via the standard modem 418, the data packet is passed by the processor 414 to the modem 418 without encrypting.

The encryption/decryption functionality of the security device 412 may be implemented in software or in hardware. In the present embodiment, software can be used for data throughput requirements of less than 10 Mbits/sec. Hardware provides faster throughput. In order to handle packets from different sources, the security device 412 may be required to perform fast key switching. In applications where only a few simultaneous sources are possible, this may be accomplished by caching the tables required for each key in memory (such as RAM. In applications where numerous simultaneous sources are possible, or where the use of memory (such as RAM) is constrained, the embodiment of FIG. 3 above may be utilized.

While preferred embodiments of this invention have been disclosed herein, those skilled in the art will appreciate that changes and modifications may be made therein without departing from the spirit and scope of the invention.

We claim:

1. A block cipher system, in which sub-blocks of data are replaced by other sub-blocks as defined by one or more mappings, wherein each snapping can be expressed as a substitution table, said system comprising:

> a first complete set of linearly independent numbers selected from a plurality of complete sets of linearly independent numbers;
>
> a key; and
>
> means for generating at least portions of a resulting n-bit encryption table (E) and a resulting n-bit decryption table (D) from a fixed n-bit source substitution table (R) stored in memory and said first complete set of linearly independent n-bit numbers.

2. The block cipher system of claim 1, wherein said first complete set of linearly independent n-bit numbers is used to form a linear transformation for the source substitution table (R).

3. The block cipher system of claim 2, wherein the linear transformation comprises a second complete set of linearly independent numbers generated by modulating the first complete set of linearly independent numbers with said key.

4. The block cipher system of claim 3, wherein said linear transformation (T) is used as follows:

For K from 0 through $2^n-1$:

$$E[T(K)]=T(R[K]),$$

and $$D[T(R[K])]=T(K).$$

5. The block cipher system of claim 4, wherein the transformation (T) comprises a right multiplication by a matrix formed from the second complete act of linearly independent numbers.

6. The block cipher system of claim 3, wherein said linear transformation is used as follows:

For K from 0 through $2^n-1$:

$$E[T(K)]=T(R[K\oplus F]),$$

and $$D[T(R[K]\oplus F)]=T(K),$$

where F is an n-bit value determined from the key.

7. The block cipher system of claim 1, wherein said means for generating comprises a means for performing a linear transformation (T) on said source substitution table (R), said transformation (T) comprising a second complete set of linearly independent numbers generated from said key and said first complete set of linearly independent numbers.

8. The block cipher system of claim 1, wherein said means for generating comprises means for concurrently generating a second complete set of linearly independent n-bit numbers to form a first linear transformation (T), and a third complete set of linearly independent n-bit numbers to form a second linear transformation ($T^{-1}$) which is the inverse of the first linear transformation (T).

9. The block cipher system of claim 1, wherein said means for generating comprises means for generating the specific n-bit output which correspond to outputs for the encryption substitution table or the decryption substitution table on an as needed basis, for each n-bit input value (U) without generating the entire encryption substitution table (E) or entire substitution table (D).

10. The block cipher system of claim 9, wherein said means for generating further comprises encryption and decryption source substitution tables, $R_E$ and $R_D$, stored in memory, and further comprises means for performing an n-bit transformation, T, and its inverse, $T^{-1}$, as follows:

$$E[U]=T(R_E[T^{-1}(U)]),$$

and $$D[U]=T(R_D[T^{-1}(U)]).$$

11. A block cipher system comprising:

a first complete set of linearly independent numbers, each of a selected bit length;

a key;

a source substitution table stored in memory;

a modulation module responsive to selected bits from said key to control operations on said first complete set of linearly independent numbers to obtain a second complete set of linearly independent numbers;

a transformation module which transforms the source substitution table stored in memory using said second complete set of linearly independent numbers to obtain a resulting substitution table; and a decryption substitution module which has an input and an output, said input comprising data blocks for which substitution is desired and said output comprising the substitution blocks for said input data blocks, said substitution blocks obtained from said resulting substitution table.

12. The block cipher system of claim 11, further comprising an encryption module with an input and an output, said input comprising data blocks for which substitution is desired and said output comprising substitution blocks for said input data blocks, said substitution blocks obtained from said resulting substitution table.

13. The block cipher system of claim 11, further comprising a plurality of complete sets of linearly independent numbers stored in memory, wherein said modulation module is responsive to selected key bits to select said first complete set of linearly independent numbers from said plurality of complete sets.

14. The block cipher system of claim 13, wherein said modulation module is responsive to other key bits to select certain numbers from said first complete set of linearly independent numbers for XOR operations with other numbers from said first complete set of linearly independent numbers to form said second set of linearly independent numbers.

15. The block cipher system of claim 11, wherein said modulation module is responsive to selected key bits to select certain numbers of said first set of linearly independent numbers for an XOR operation with other numbers of said first set of linearly independent numbers to form said second set of linearly independent numbers.

16. The block cipher system of claim 11, wherein said transformation module forms a matrix of the second set of linearly independent numbers and uses this matrix as a transformation of the source substitution table to form said resulting substitution table.

17. The block cipher system of claim 16, wherein said transformation module right multiplies data from said source substitution table by said matrix to form said resulting substitution table.

18. The block cipher system of claim 17, wherein said source substitution table comprises a plurality of data blocks of a predetermined bit length, and wherein said transformation comprises two inputs, said first input being an index input and said second input being said data blocks from said source substitution table, wherein said transformation module right multiplies said index by said matrix and right multiplies said data blocks by said matrix in order to obtain said resulting substitution table.

19. The block cipher system of claim 18, wherein said transformation module comprises outputs, said outputs comprising a transformed index and a transformed data block, said index providing an address for the transformed data block.

20. A block cipher system comprising:

a first complete set of linearly independent numbers, each of a selected bit length;

a key;

a source substitution table stored in memory;

a transformation module which transforms the source substitution table stored in memory using a transformation from said first complete set of linearly independent numbers and said key to obtain a temporary portions of a resulting substitution table on an as needed basis, without generating entire substitution tables for encryption and decryption; and a crypto module which has an input and an output, sad input comprising data blocks to be encrypted or decrypted and said output comprising substitution blocks for said input data blocks, said substitution blocks obtained from said temporary portions of the resulting substitution table.

21. The block cipher system of claim 20, wherein said transformation module comprises an n-bit transformation logic and an n-bit inverse transformation logic.

22. The block cipher system of claim 21, wherein said n-bit linear transformation logic and said n-bit inverse linear transformation logic have variable portions which are configured simultaneously.

23. The block cipher system of claim 21, wherein said transformation module performs the following transformation:

$$E[U]=T(R_E[T^{-1}(U)]),$$

and $$D[U]=T(R_D[T^{-1}(U)]),$$

where $R_E$ is the source encryption substitution table, $R_D$ is the source decryption substitution table, $T^{-1}$ is the inverse n-bit linear transformation, T is the n-bit linear transformation, E[U] is the temporary portion of the resulting encryption substitution table and D[U] is the temporary portion of the resulting decryption table and U is the input data block.

* * * * *

UNITED STATES PATENT AND TRADEMARK OFFICE
CERTIFICATE OF CORRECTION

PATENT NO. : 5,778,074
DATED : July 7, 1998
INVENTOR(S) : Knute T. Garcken, Charles E. Strawbridge, and Andrew Philip Kisylia It is certified that error appears in the above-identified patent and that said Letters Patent is hereby corrected as shown below:

Claim 1, Column 18, Line 6 "each snapping" should be changed to read "each mapping".

Claim 5, Column 18, Line 36 "complete act of" should be changed to read "complete set of".

Claim 20, Column 20, Line 32 "sad input" should be changed to read "said input".

Signed and Sealed this

Twenty-third Day of March, 1999

Attest:

Q. TODD DICKINSON

*Attesting Officer*  *Acting Commissioner of Patents and Trademarks*